(12) United States Patent
Beddow

(10) Patent No.: US 7,921,111 B1
(45) Date of Patent: *Apr. 5, 2011

(54) DIGITAL MEDIA ORGANIZATION AND ACCESS

(75) Inventor: Greg Beddow, Santa Rosa, CA (US)

(73) Assignee: Fotiva, Inc., San Jose, CA (US)

( * ) Notice: Subject to any disclaimer, the term of this patent is extended or adjusted under 35 U.S.C. 154(b) by 379 days.

This patent is subject to a terminal disclaimer.

(21) Appl. No.: 11/935,991

(22) Filed: Nov. 6, 2007

Related U.S. Application Data

(63) Continuation of application No. 10/151,651, filed on May 16, 2002, now Pat. No. 7,296,032.

(60) Provisional application No. 60/291,840, filed on May 17, 2001.

(51) Int. Cl.
G06F 17/30 (2006.01)

(52) U.S. Cl. .................................. 707/736

(58) Field of Classification Search .................. None
See application file for complete search history.

(56) References Cited

U.S. PATENT DOCUMENTS

| | | | |
|---|---|---|---|
| 4,888,692 A | 12/1989 | Gupta et al. | |
| 5,214,622 A | 5/1993 | Nemoto et al. | |
| 5,241,671 A | 8/1993 | Reed et al. | |
| 5,260,868 A | 11/1993 | Gupta et al. | |
| 5,491,626 A | 2/1996 | Williams et al. | |
| 5,557,747 A | 9/1996 | Rogers et al. | |
| 5,559,942 A | 9/1996 | Gough et al. | |
| 5,613,122 A * | 3/1997 | Burnard et al. | 713/1 |
| 5,644,766 A | 7/1997 | Coy et al. | |
| 5,652,884 A * | 7/1997 | Palevich | 713/1 |
| 5,664,063 A | 9/1997 | Johnson et al. | |
| 5,668,966 A | 9/1997 | Ono et al. | |
| 5,680,619 A * | 10/1997 | Gudmundson et al. | 717/108 |
| 5,692,175 A | 11/1997 | Davies et al. | |

(Continued)

FOREIGN PATENT DOCUMENTS

JP 08030763 2/1996

OTHER PUBLICATIONS

Al Stevens and Clayton Walnum, "Standard C++ Bible," pp. 324-327, 332-334, 353-354, 470-478, 589-598, 691-712, IDG Books Worldwide, Inc., Copyright © 2000.

(Continued)

*Primary Examiner* — Sathyanarayan Pannala
*Assistant Examiner* — Yuk Ting Choi
(74) *Attorney, Agent, or Firm* — Fish & Richardson P.C.

(57) ABSTRACT

Methods and apparatus, including computer program products, implementing and using techniques for accessing and organizing data items, including items of digital media, such as digital images, video stream, audio stream, text documents and the like. An object model defines a plurality of data object classes, including a media object class for representing items of digital media and a tag object class for representing categories of digital media. A request for one or more data items specifies a search condition. A collection of one or more data objects instantiated from the data object classes is generated, whereby the data objects in the collection represent data items satisfying the search condition. An iterator configured to sequentially access the data items represented by the data objects in the collection of data objects is generated and used to sequentially access the data items.

22 Claims, 12 Drawing Sheets

U.S. PATENT DOCUMENTS

| | | | |
|---|---|---|---|
| 5,706,457 | A | 1/1998 | Dwyer et al. |
| 5,734,888 | A | 3/1998 | Li et al. |
| 5,751,286 | A | 5/1998 | Barber et al. |
| 5,761,655 | A | 6/1998 | Hoffman |
| 5,787,412 | A | 7/1998 | Bosch et al. |
| 5,796,945 | A | 8/1998 | Tarabella |
| 5,813,014 | A | 9/1998 | Gustman |
| 5,832,495 | A | 11/1998 | Gustman |
| 5,842,218 | A | 11/1998 | Robinson |
| 5,844,572 | A | 12/1998 | Schott |
| 5,884,298 | A | 3/1999 | Smith et al. |
| 5,898,431 | A | 4/1999 | Webster et al. |
| 5,907,324 | A | 5/1999 | Larson et al. |
| 5,907,704 | A * | 5/1999 | Gudmundson et al. ....... 717/100 |
| 5,918,052 | A | 6/1999 | Kruskal et al. |
| 5,956,730 | A | 9/1999 | Burroughs et al. |
| 6,009,422 | A | 12/1999 | Ciccarelli |
| 6,017,157 | A | 1/2000 | Garfinkle et al. |
| 6,085,205 | A | 7/2000 | Peairs et al. |
| 6,094,657 | A | 7/2000 | Hailpern et al. |
| 6,148,260 | A | 11/2000 | Musk et al. |
| 6,148,354 | A | 11/2000 | Ban et al. |
| 6,195,651 | B1 | 2/2001 | Handel et al. |
| 6,199,099 | B1 | 3/2001 | Gershman et al. |
| 6,202,061 | B1 | 3/2001 | Khosla et al. |
| 6,240,423 | B1 | 5/2001 | Hirata |
| 6,246,410 | B1 | 6/2001 | Bergeron et al. |
| 6,370,541 | B1 | 4/2002 | Chou et al. |
| 6,396,963 | B2 | 5/2002 | Shaffer et al. |
| 6,401,085 | B1 | 6/2002 | Gershman et al. |
| 6,408,301 | B1 | 6/2002 | Patton et al. |
| 6,425,017 | B1 | 7/2002 | Dievendorff et al. |
| 6,434,546 | B1 | 8/2002 | Williamowski et al. |
| 6,442,527 | B1 | 8/2002 | Worthington |
| 6,466,940 | B1 | 10/2002 | Mills |
| 6,504,571 | B1 | 1/2003 | Narayanaswami et al. |
| 6,529,914 | B1 * | 3/2003 | Doan et al. ................. 707/103 Y |
| 6,581,102 | B1 | 6/2003 | Amini et al. |
| 6,587,668 | B1 | 7/2003 | Miller et al. |
| 6,587,856 | B1 | 7/2003 | Srinivasan et al. |
| 6,598,046 | B1 | 7/2003 | Goldberg et al. |
| 6,628,899 | B1 | 9/2003 | Kito |
| 6,629,104 | B1 | 9/2003 | Parulski et al. |
| 6,738,155 | B1 | 5/2004 | Rosenlund et al. |
| 6,760,884 | B1 | 7/2004 | Vertelney et al. |
| 6,845,370 | B2 | 1/2005 | Burkey et al. |
| 6,904,427 | B1 | 6/2005 | Hagiwara et al. |
| 6,947,959 | B1 | 9/2005 | Gill |
| 6,957,205 | B1 | 10/2005 | Liongosari |
| 6,993,723 | B1 | 1/2006 | Danielsen et al. |
| 7,017,162 | B2 | 3/2006 | Smith et al. |
| 7,020,686 | B2 | 3/2006 | Banatwala |
| 7,028,262 | B2 | 4/2006 | Estrada et al. |
| 7,032,178 | B1 * | 4/2006 | McKnight et al. ............ 715/747 |
| 7,034,691 | B1 | 4/2006 | Rapaport et al. |
| 7,069,259 | B2 | 6/2006 | Horvitz et al. |
| 7,076,503 | B2 | 7/2006 | Platt et al. |
| 7,076,504 | B1 | 7/2006 | Handel et al. |
| 7,082,430 | B1 | 7/2006 | Danielson et al. |
| 7,103,559 | B2 | 9/2006 | Worthington |
| 7,296,032 | B1 | 11/2007 | Beddow |
| 7,298,520 | B2 | 11/2007 | Ohkubo et al. |
| 7,363,590 | B2 | 4/2008 | Kerr et al. |
| 7,415,662 | B2 | 8/2008 | Rothmuller et al. |
| 7,472,135 | B2 | 12/2008 | Huuskonen |
| 2002/0087546 | A1 | 7/2002 | Slater et al. |
| 2002/0097259 | A1 | 7/2002 | Marshall et al. |
| 2002/0140730 | A1 | 10/2002 | Linsey et al. |
| 2002/0140820 | A1 | 10/2002 | Borden |
| 2002/0149618 | A1 | 10/2002 | Estrada et al. |
| 2002/0165753 | A1 | 11/2002 | Worthington |
| 2002/0170040 | A1 | 11/2002 | Idan |
| 2003/0084065 | A1 | 5/2003 | Lin et al. |
| 2003/0154212 | A1 | 8/2003 | Schirmer et al. |
| 2003/0167310 | A1 | 9/2003 | Moody et al. |
| 2003/0200192 | A1 | 10/2003 | Bell et al. |
| 2004/0002932 | A1 | 1/2004 | Horvitz et al. |
| 2004/0078372 | A1 | 4/2004 | Huuskonen |
| 2004/0078389 | A1 | 4/2004 | Hamilton |
| 2005/0044066 | A1 | 2/2005 | Hooper et al. |
| 2005/0044529 | A1 | 2/2005 | Simons et al. |
| 2005/0050043 | A1 | 3/2005 | Pyhalammi et al. |
| 2005/0057584 | A1 | 3/2005 | Gruen et al. |
| 2005/0182752 | A1 | 8/2005 | Rojer |
| 2005/0207645 | A1 | 9/2005 | Nishimura et al. |
| 2008/0306921 | A1 | 12/2008 | Rothmuller et al. |

OTHER PUBLICATIONS

"Adobe Acquires Fotiva", Silicon Valley / San Jose Business Journal, Dec. 5, 2001, p. 1 (downloaded from: sanjose.bizjournals.com/sanjose/stories/2001/12/03/daily29. html?t=printable).

"Adobe Acquires Technology to Create Complete Image Management and Sharing Solution", Adobe Press Release, Dec. 5, 2001, pp. 1-3 (downloaded from: www.adobe.com/aboutadobe/pressroom/pressreleases/200112/20011205fotiva.html).

Ahlberg: "Spotfire: An Information Exploration Environment", Dec. 1, 1996; IVEE Development AB, Chalmers University of Technology & SSKKII, Sweden.

Ahlberg, Christopher, et al., "Visual Information Seeking Using the FilmFinder", CHI '94, Boston, MA, Apr. 1994, pp. 433 and 484 (2 pages).

Balabanovic, Marko, et al., "Storytelling with Digital Photographs", CHI '2000, The Hague, Amersterdam, Apr. 1-6, 2000, CHI Letters, vol. 2 issue 1, pp. 564-571 [ACM 1-58113-036-8/98/0008].

Beaza-Yates, R. and Ribeiro-Neto, B.: "Modern Information Retrieval"; Addison Wesley, USA XP002210866; ISBN: 0-201-39829-X; Chapter 10: "User Interfaces and Visualization".

Bell Gordon, "A Personal Digital Store", Communications of the ACM, vol. 44 No. 1, pp. 86-91.

Cha, Guang-Ho, et al., "Object-Oriented Retrieval Mechanism for Semistructured Image Collections", Multimedia '98, Bristol, UK, Sep. 1998, pp. 323-332 [ACM 1-58113-036-8/98/0008] (plus citation page).

Christel, Michael, "Visual Digests for News Video Libraries", ACM Multimedia '99, Orlando, FL, Oct. 1999, pp. 303-311.

Christensson, et al. "Universal Plug and Play Connects Smart Devices", as archived by the Wayback Machine™ on Oct. 23, 1999 pp. 1-22 (Note: the May 27, 2004 on the page refers to the date of the download, not the publication date).

Cho, J., et al., "The Evolution of the Web and Implication for an Incremental Crawler", 1993, pp. 1-50.

Goland, et al. "Simple Service Discovery Protocol/1.0 Operating Without an Arbiter", Oct. 28, 1999, published by the Internet Engineering Task Force (IETF), 17 sheets.

Grant, C., "FTP Reviewed", pintday.org, 1998 [online] [retrieved on Nov. 18, 2009], pp. 1-6.

Hearst: "Next Generation Web Search: Setting our Sites"; Sep. 2000; Bulletin of the Technical Committee on Data Engineering, School of Information Management and Systems, University of California at Berkeley, CA.

Hill, Linda L. et al., "Collection Metadata Solutions for Digital Library Applications," Journal of the American Society for Information Science, vol. 50, No. 13, © 1999, pp. 1169-1181.

Hirata, Kyoji, et al., "Facilitating Object-Based Navigation Through Multimedia Databased,", Theory and Practice of Object Systems, vol. 4, No. 4, © 1998, pp. 261-283.

Holtkamp, Demom, A Media Object Model Incorporating Natural Language Descriptions for Retrieval Support, 1990, pp. 1-25.

Hughes, Cho, "Entering the World-Wide Web: A Guide to Cyberspace", AFN.org, 1993, [online] [retrieved on Nov. 18, 2009], Retrieved from the Internet: <URL: http://www/afn.org/~bcs/sw/sam/html/intro/index.htm, pp. 1-5.

International Preliminary Report from International Application No. PCT/US02/01530, mailed May 8, 2003, 11 pages.

International Search Report from International Application No. PCT/US02/01530, mailed Dec. 5, 2002, 7 pages.

"Introducing Fotiva, Inc., NEA-Backed New Consumer Digital Software and Services Company; Led by Former Intuit SVP, Company Plans on Launching Mass-Appeal Digital Solutions", Business Wire, Oct. 8, 2001, pp. 1-2 (downloaded from: www.findarticles.com/articles/mi_mOEIN/is_2OO1_Oct_8/ai_78958587/print).

Keim, "A Graphical Database Interface for a Multimedia DBMS", Naval Post Graduate School, Monterey, CA, Jun. 1991, pp. 1-25.

Kuchinsky, Allan, et al., "FotoFile: A Consumer Multimedia Organization and Retrieval System", CHI '99, Pittsburgh, PA, May 15-20, 1999, pp. 496-503.

Li, Wen-Syan, et al., "Brokerage Architecture for Stock Photo Industry," RIDE 1997, Apr. 7-8, 1997, pp. 91-100.

Loui, Alexander C., et al., "A Software System for Automatic Albuming of Consumer Pictures", Multimedia '99 (Part 2), Orlando, FI; Oct. 1999, pp. 159-162 [ACM 1-58113-239-5/99/0010].

Mills, Timothy J., et al., "Managing Photos with AT&T Shoebox", SIGIR 2000, Athens, Greece, Jul. 2000, p. 390 [ACM 1-58113-226-3/00/0007] (plus citation page).

Mills, Timothy J., et al., "Shoebox: A Digital Photo Management System", Technical Report 2000.10, AT&T Laboratories Cambridge, (c) 2000, pp. 1-8.

North, Chris, et al., "Snap-Together Visualization: A User Interface for Coordinating Visualizations via Relational Schemata", AVI 2000, Palermo, Italy, May 2000, pp. 128-135.

Quinn: "PCT Invitation to Pay Additional Fees with Partial International Search Report"; Sep. 19, 2002; PCT/US02/01530.

"Read Me for iPhoto 2.0 for Mac OS X" [online], Jan. 30, 2003, Retrieved from Apple.Com Worldwide using Internet http://does.info.apple.com/article.html?artnum=120188.

Roth, S., et al.: "Towards an Information Visualization Workspace: Combining Multiple Means of Expression"; 1997; Human-Computer Interaction Journal, vol. 12, No. 1-2, Lawrence Erlbaum Associates.

Shneiderman, Ben: "Designing the user interface: Strategies for effective human-computer interaction", 1959; Addison Wesley, USA XP 002210867; ISBN: 0-201-69497-2; Chapter 15: "Information Search and Visualization".

Smith, Brian K., et al., "Inquiry with Imagery: Historical Archive Retrieval with Digital Cameras", Multimedia '99, Orlando, FI, Oct. 1999, pp. 405-408 [ACM 1-58113-151-8/99/0010].

Snell, "Sams Teach Yourself the Internet in 24 Hours", $3^{rd}$ Edition, 1999, pp. 136, 151-156.

Toyama, Kentaro, et al., "Geographic Location Tags on Digital Images", MM '03, Berkeley, CA, Nov. 2-8, 2003, pp. 156-166 [ACM 1-58113-722-2/03/0011].

Web page, http://www.upop.org as archived by the Wayback Machine™ on Oct. 23, 1999, 8 sheets.

\* cited by examiner

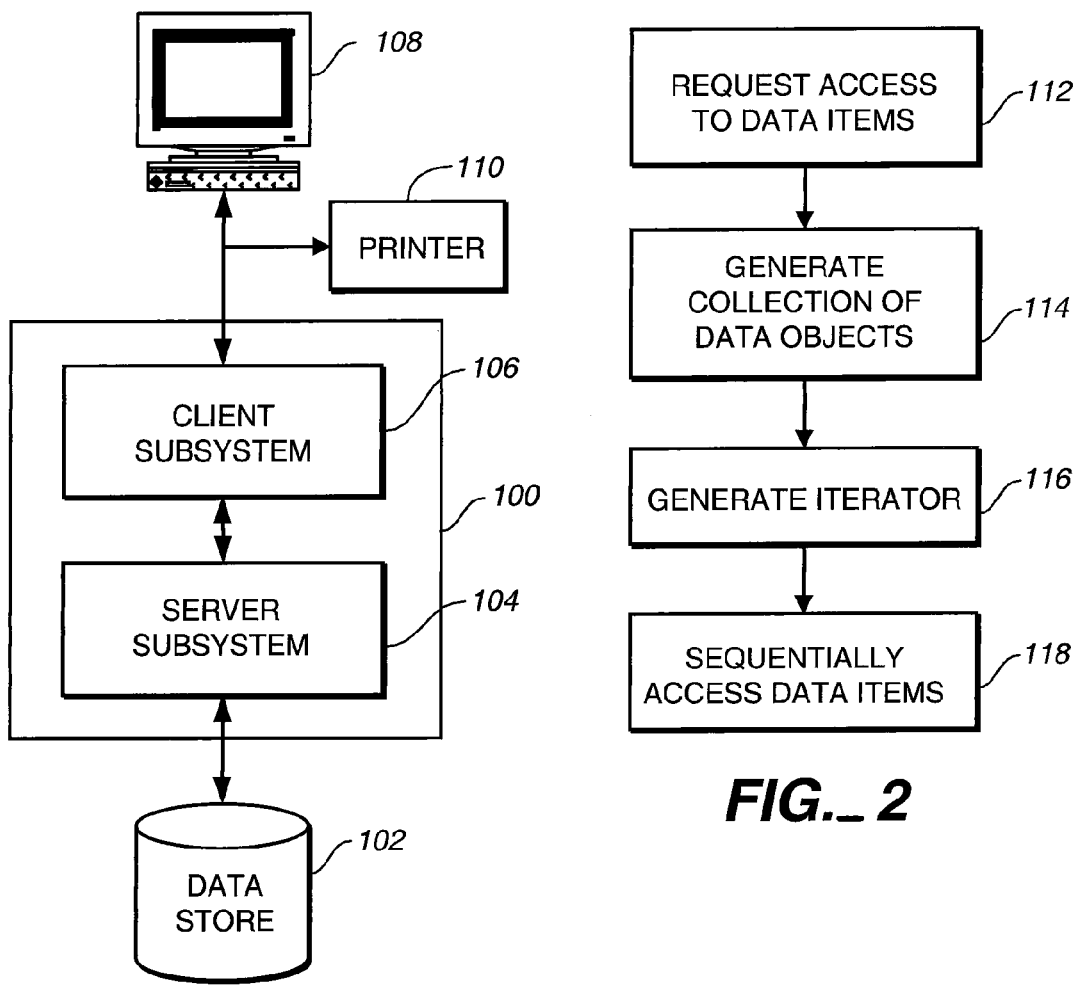
FIG._1
FIG._2

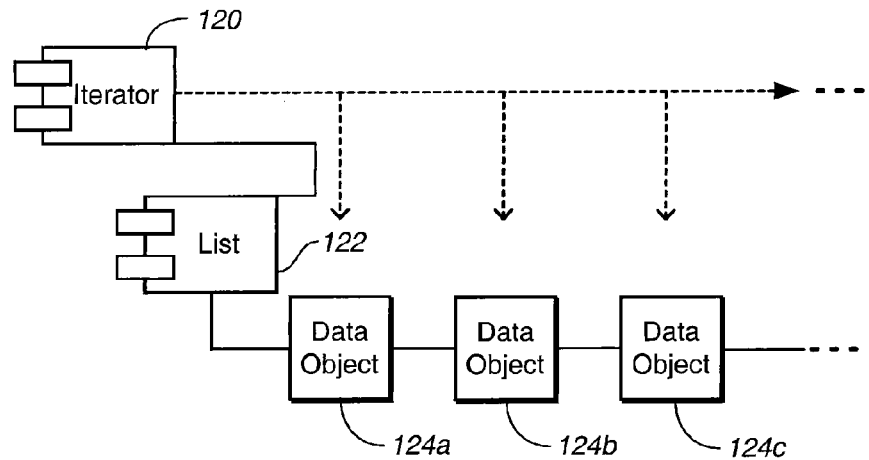
FIG._3
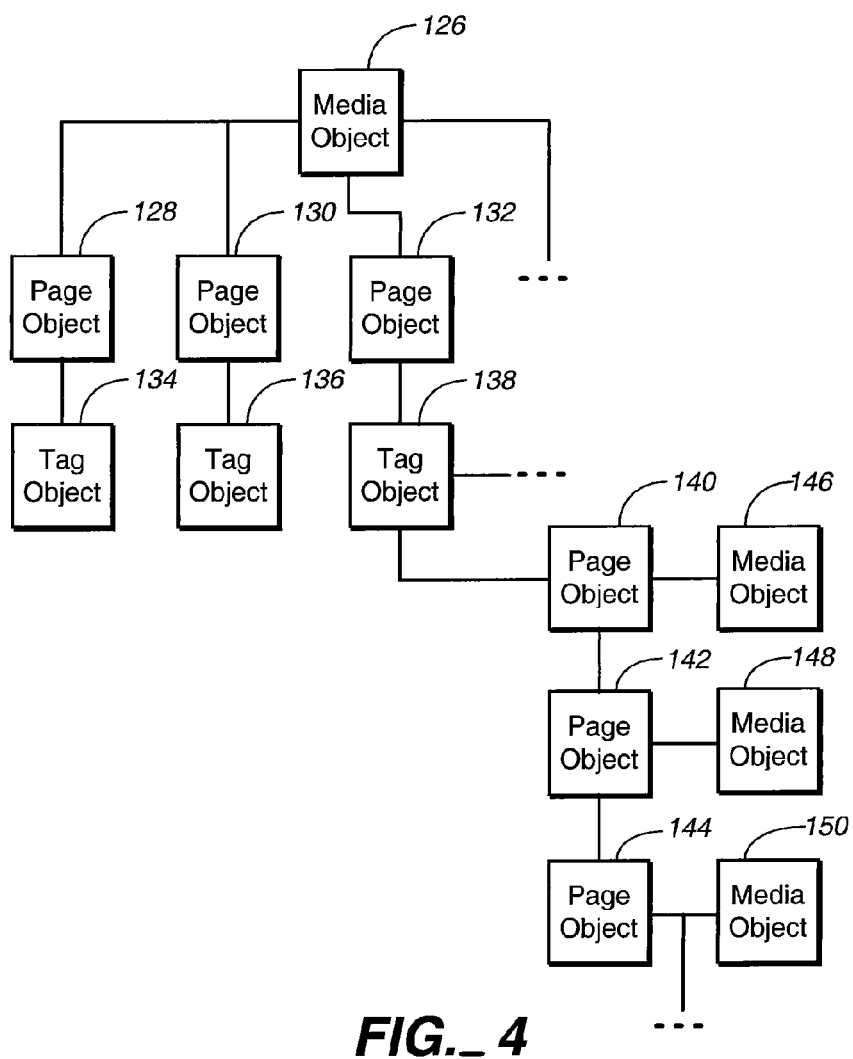
FIG._4

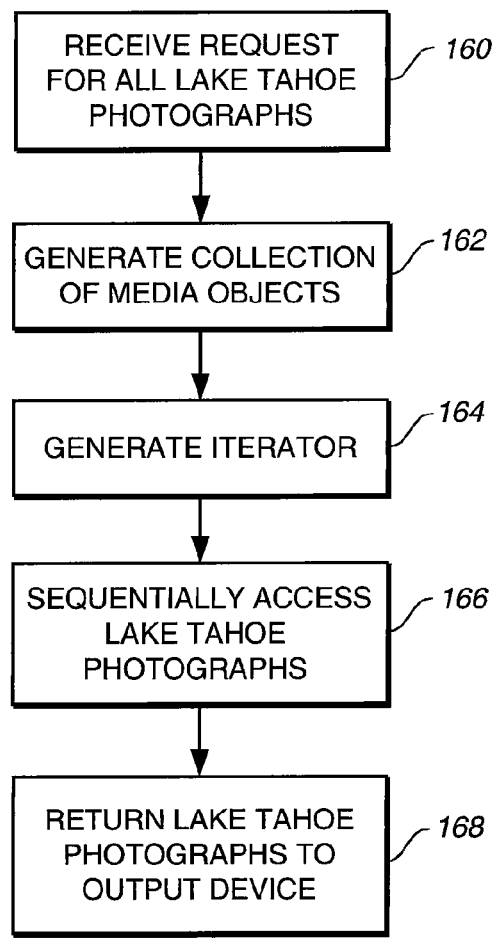
FIG._5
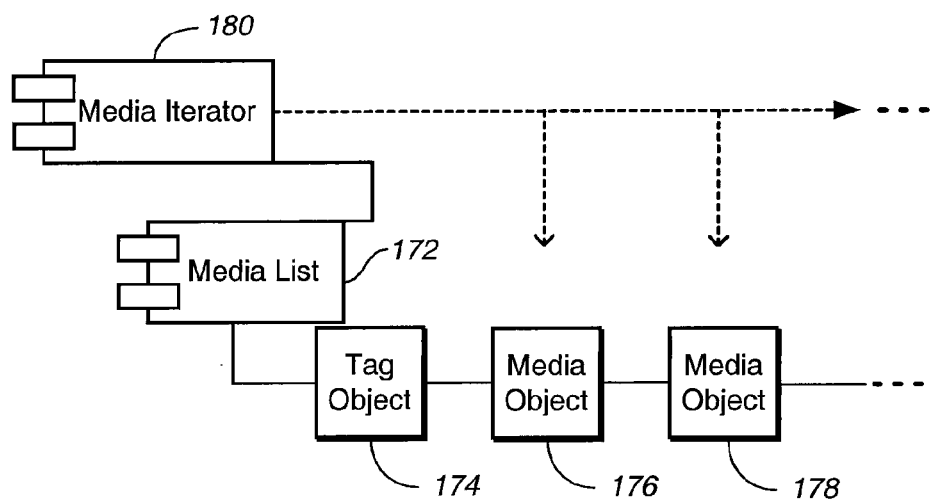
FIG._6

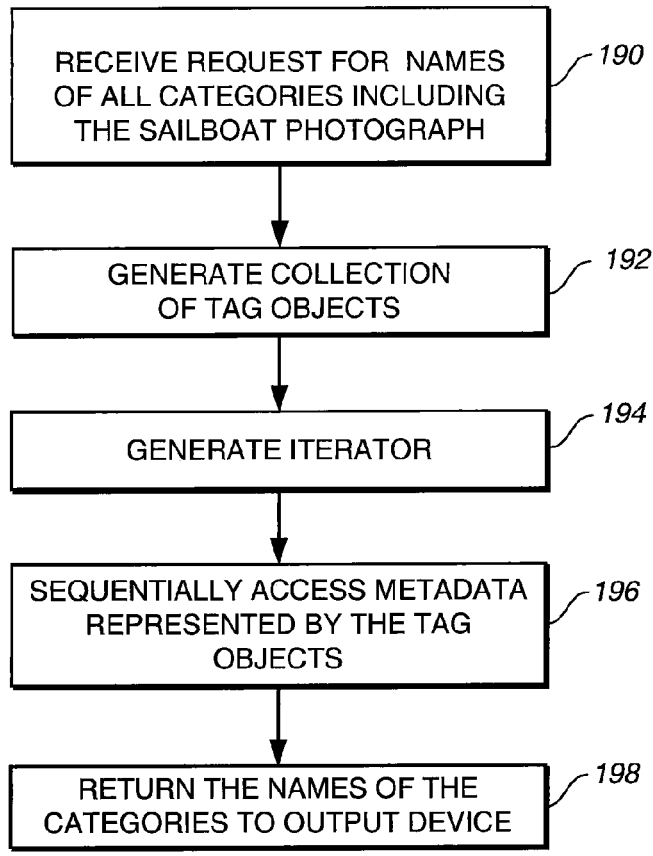
FIG._7
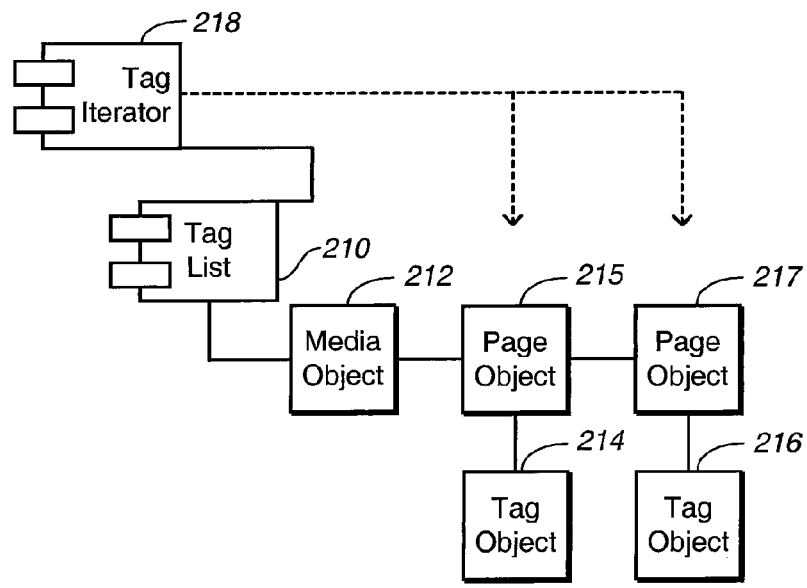
FIG._8

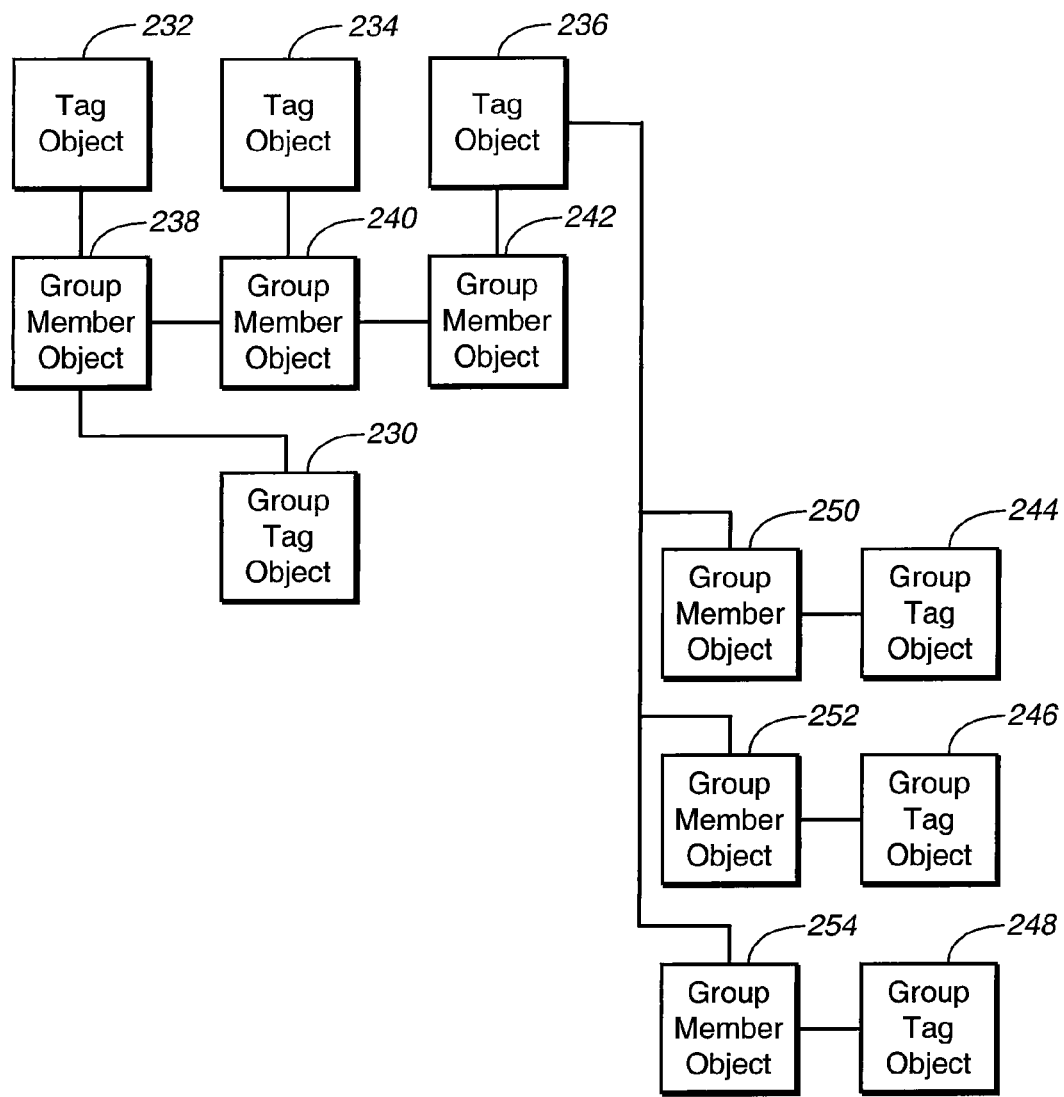
FIG. _ 9

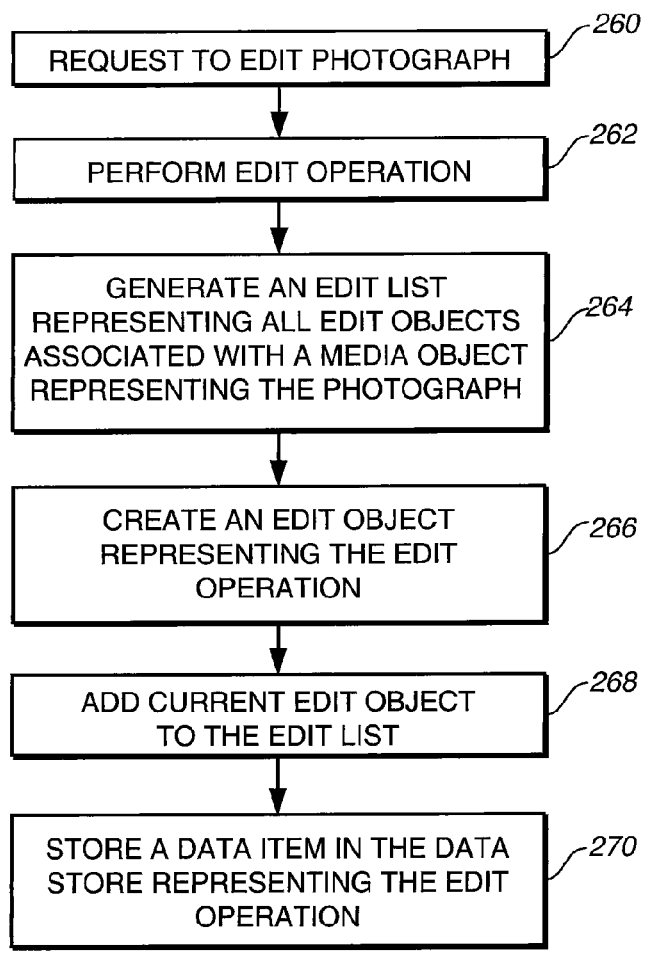
FIG._10
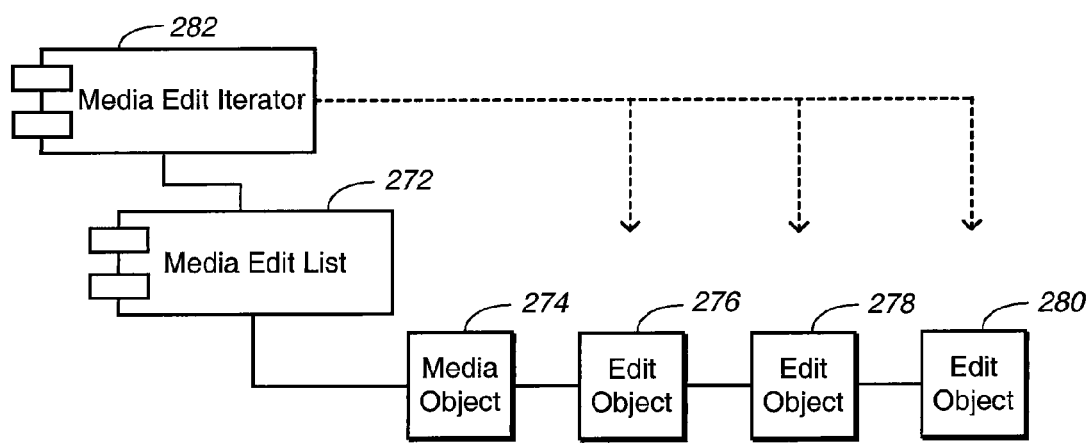
FIG._11

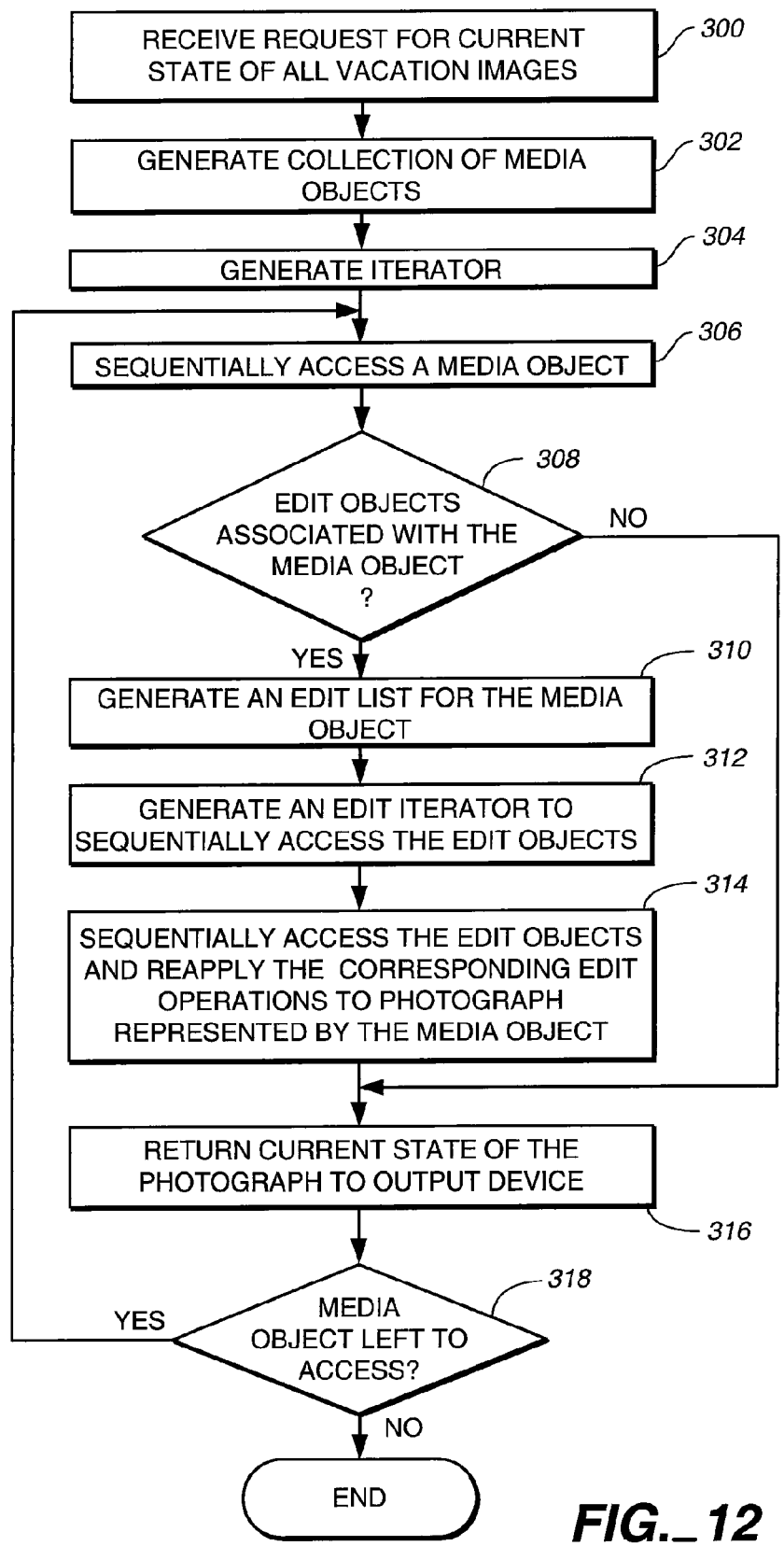
FIG._12

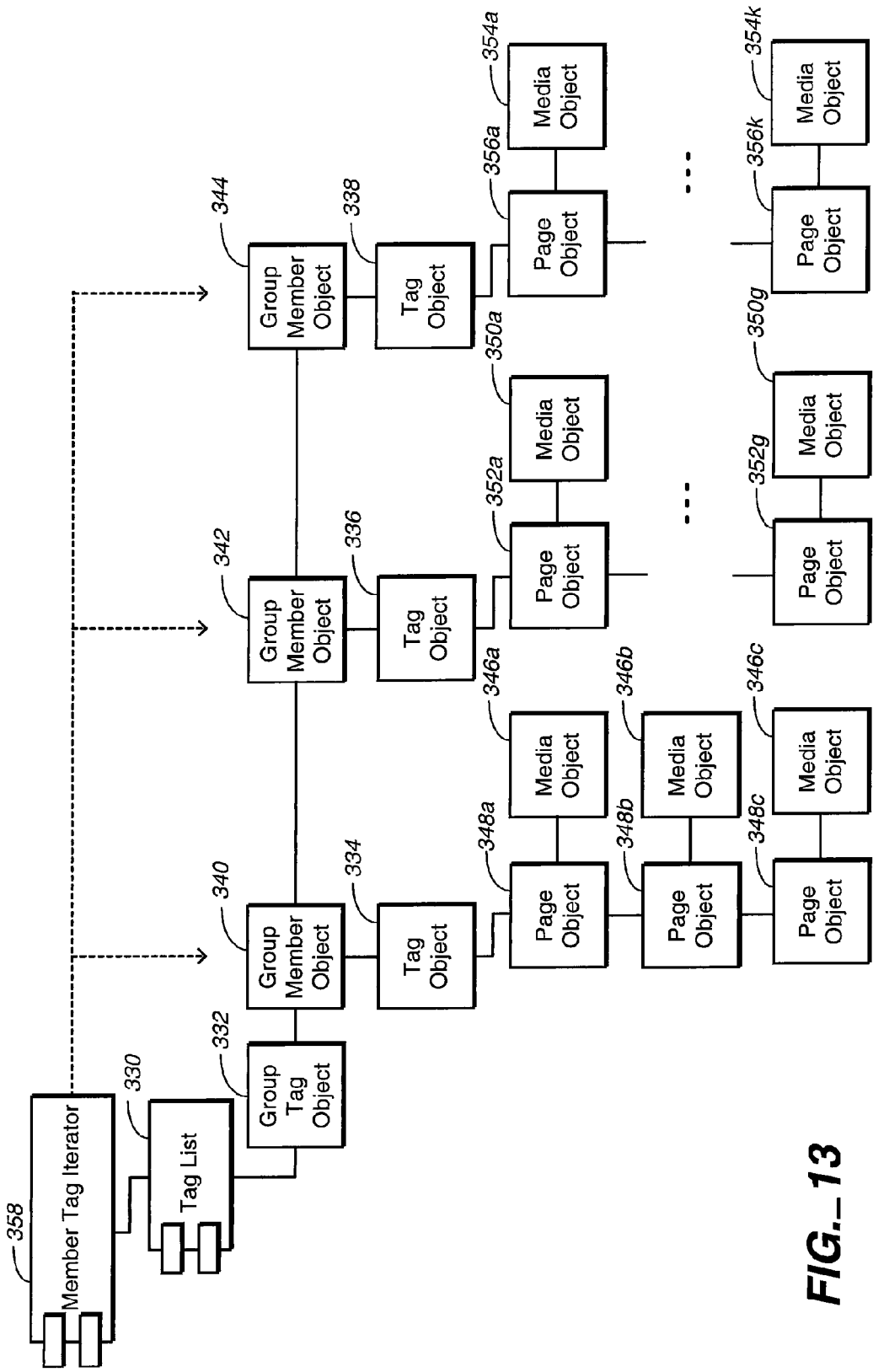
FIG._13

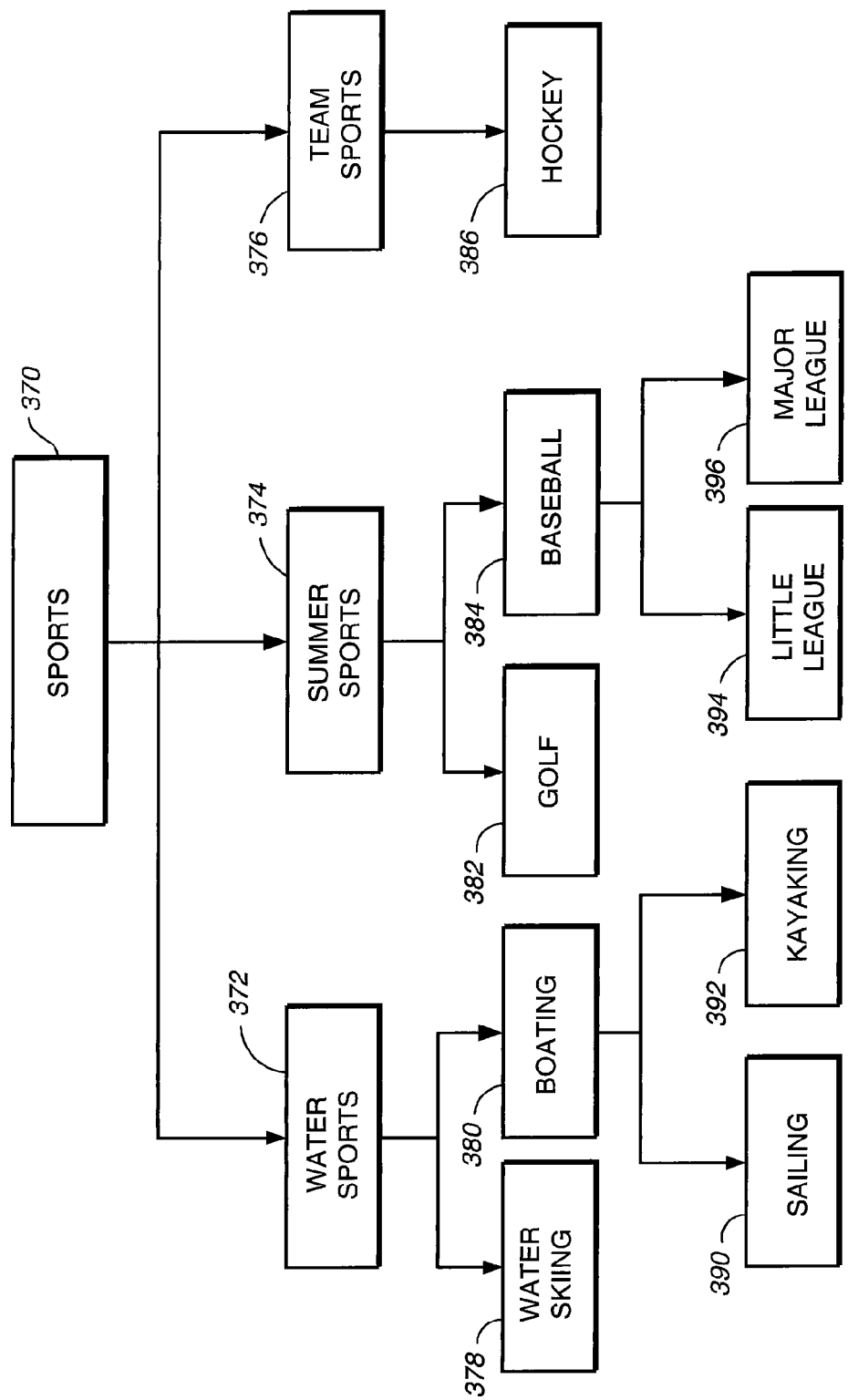
FIG._14

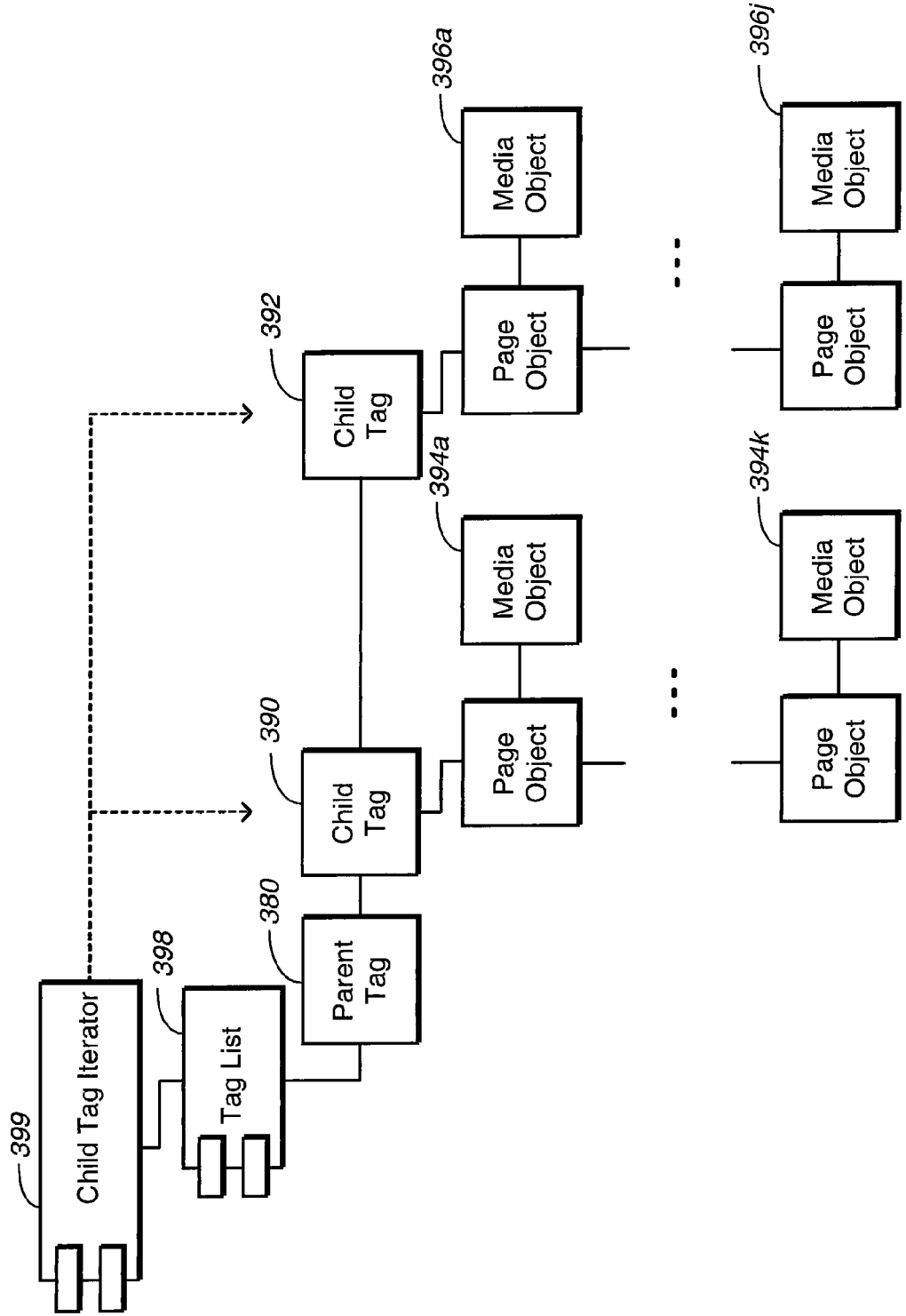
FIG._15

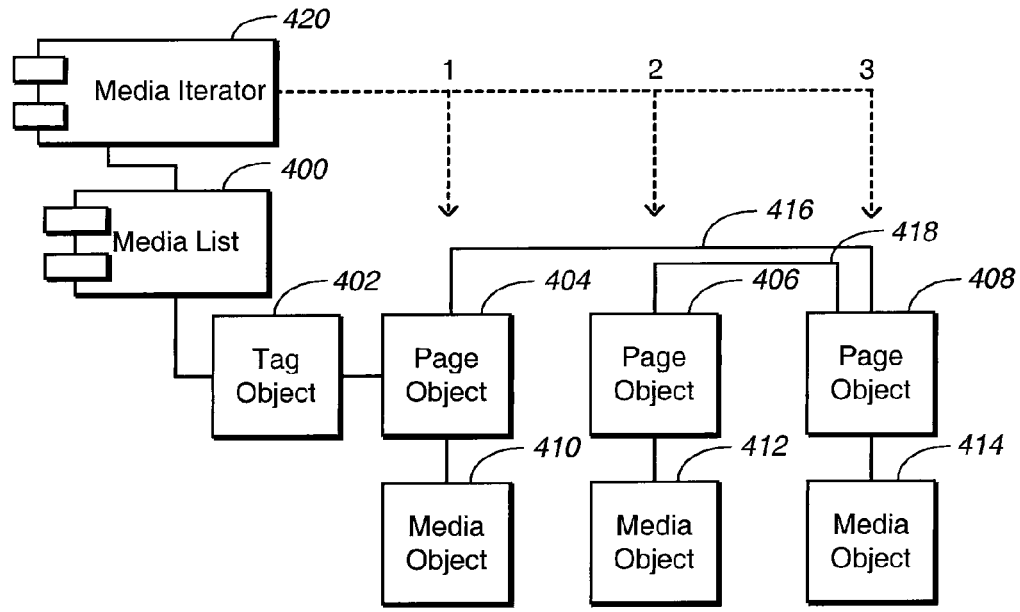
FIG._16
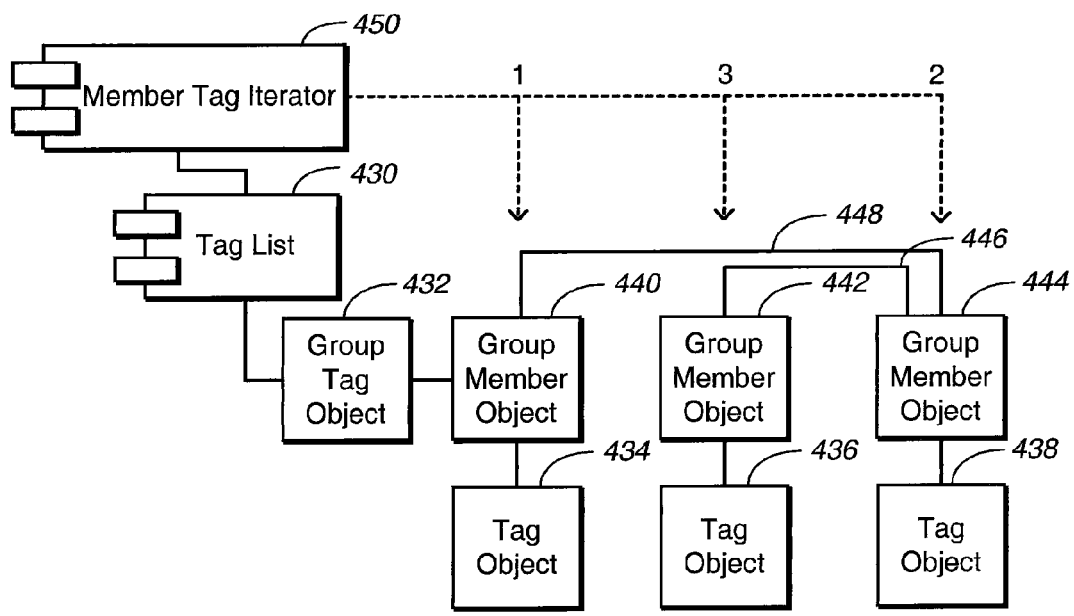
FIG._17

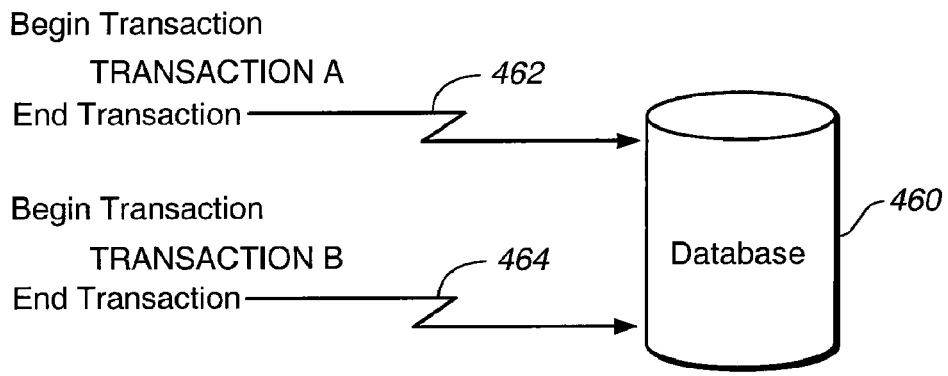
FIG._18
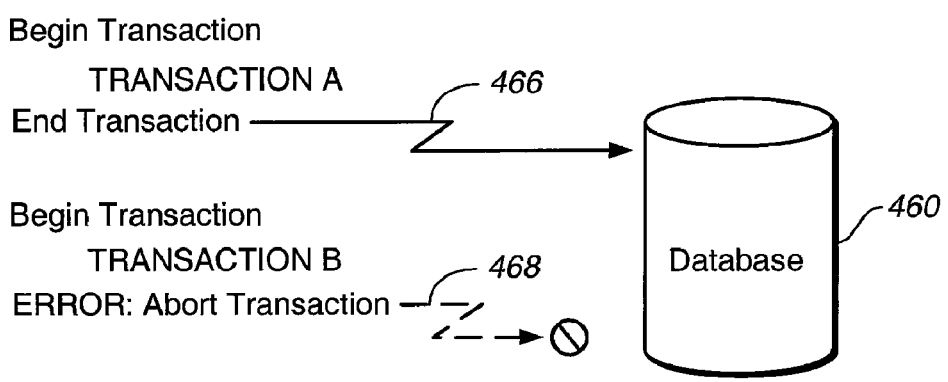
FIG._19
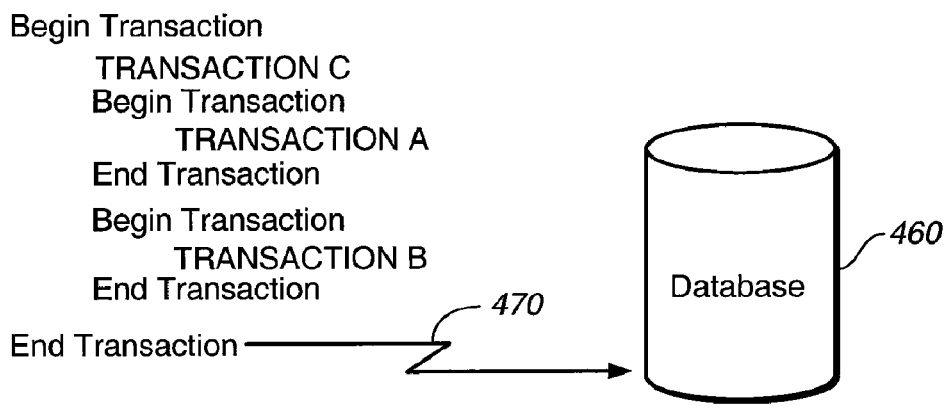
FIG._20

DIGITAL MEDIA ORGANIZATION AND ACCESS

CROSS REFERENCE TO RELATED APPLICATIONS

This application is a continuation of and claims priority to pending U.S. application Ser. No. 10/151,651, entitled "DIGITAL MEDIA ORGANIZATION AND ACCESS", filed on May 16, 2002, which claims priority to U.S. Provisional Application Ser. No. 60/291,840, filed May 17, 2001. Priority is claimed to the aforementioned patent applications and the entire contents of both are hereby incorporated by reference.

BACKGROUND OF INVENTION

This invention relates to accessing and organizing data items.

With the advent of digital photography and the world-wide-web, there has been an exponential growth in the creation and storage of digital photographic images. As the number of digital photographs taken and stored has grown, so too has the need for a convenient method of archiving, cataloguing, searching, and retrieving them. Modern methods of archiving and storing digital images typically require users to remember large amounts of information merely to locate photos that are of particular interest to them. For example, many users currently store their digital images in the hierarchical, directory-based file system structure that is native to personal computers. To find particular photos stored in such a hierarchical directory tree or structure, users must know the full pathname to the directory in which their photographs are stored.

There are other disadvantages to storing digital photographs in a hierarchical, directory-based file system. For example, cataloguing and storing groups of photos by categories such as vacation photos or wedding photos requires creating different directories for each of the desired categories. This further increases the amount of information that must be remembered in order to locate desired photos. In addition, in order to store photos in two or more overlapping categories, such as photos that include your favorite aunt and photos from your cousin's wedding, users must either store duplicate photographs, or master the concepts of directory trees and file pointers. While these are not difficult concepts for sophisticated computer users, they can be troublesome for less sophisticated users, thereby limiting the useful ways these users can store and retrieve digital photographs and other data items, such as video streams, audio streams and text documents.

SUMMARY

The present invention provides methods and apparatus, including computer program products, for accessing and organizing items of digital media, including digital images, video stream, audio stream, text documents and the like. In general, in one aspect, the invention features providing an object model defining a plurality of data object classes, the data object classes including a media object class for representing items of digital media and a tag object class for representing categories of digital media. A media object is an instantiation of the media object class, and can be associated with zero or more tag objects. A tag object is an instantiation of the tag object class, and can be associated with zero or more media objects.

A request is received for one or more data items, the request specifying a search condition. A collection of one or more data objects instantiated from the data object classes is generated, whereby the data objects in the collection represent data items satisfying the search condition. An iterator configured to sequentially access the data items represented by the data objects in the collection of data objects is generated and used to sequentially access the data items.

Implementations of the invention may include one or more of the following. The object model can further include an edit object class for representing edit operations. An edit object is an instantiation of the edit object class, and is associated with a media object representing an item of digital media on which an edit operation represented by the edit object has been performed.

A search condition can specify one or more categories of digital media, and a collection of data objects can be generated by identifying items of digital media associated with the specified categories. In this implementation, the collection represents, directly or indirectly, media objects representing the identified items of digital media.

A search condition can specify metadata, and a collection of data objects can be generated by identifying data items based at least in part on the specified metadata. In this implementation, the collection represents data objects representing the identified data items.

A search condition can specify a set of categories of digital media, and a collection of data objects can be generated by identifying items of digital media associated with one or more of the categories associated with the specified set. In this implementation, the collection represents a collection of media objects representing the identified items of digital media. The set can be specified by a group, or alternatively, the set can be specified by a parent.

A search condition can specify one or more items of digital media including one or more of a digital image, video stream, audio stream and text document, and a collection of data objects can be generated by identifying one or more categories of digital media associated with the specified items of digital media. In this implementation, the collection represents a collection of tag objects representing the identified digital media categories.

A search condition can specify a set of categories of digital media, and a collection of data objects can be generated by identifying one or more categories of digital media associated with the specified set. In this implementation, the collection represents a collection of tag objects representing the identified digital media categories.

The object model can further include a group tag object class for representing groups of categories of digital media. A group tag object is an instantiation of the group tag object class, and can be associated with zero or more tag objects representing categories of digital media included in a group of categories represented by the group tag object. A search condition can specify one or more categories of digital media. A collection of data objects can be generated by identifying one or more groups of a plurality of categories of digital media, the groups associated with the specified categories. In this implementation, the collection of data objects represents a collection of group tag objects representing the identified groups. In another implementation, the search condition can specify one or more items of digital media, and a collection of group tag objects can be generated by identifying one or more groups of a plurality of categories of digital media, the groups associated with media objects representing the specified items of digital media.

A search condition can specify one or more items of digital media, and a collection of data objects, for each specified item of digital media, can be generated by identifying one or more operations previously performed on the item of digital media. In this implementation, the collection represents a collection of data objects representing the identified operations for the corresponding items of digital media. In one implementation, the identified operations can include edit operations previously performed on the specified items of digital media, and an iterator can be used to sequentially access the identified edit operations for each item of digital media and reapply each edit operation to the item of digital media to create a current state of the item of digital media.

In another implementation, each data object can represent a processing operation previously performed on the specified items of digital media. An iterator can be used to sequentially access the identified processing operations for each item of digital media and to generate a processing history log for the corresponding item of digital media.

A search condition can specify one or more categories of digital media, and a collection of data objects can be generated by identifying items of digital media associated with the specified categories. In this implementation, the collection represents a collection of media objects representing the identified items of digital media. An edit list for each media object in the collection of media objects that represents an item of digital media previously edited by one or more edit operations can be generated. The edit list represents one or more edit objects representing the one or more edit operations performed on the corresponding item of digital media. An edit iterator is generated for each edit list, the edit iterator configured to sequentially access edit operations represented by the edit objects. The edit iterator is used to sequentially access the identified edit operations for each media object and reapply each edit operation to the item of digital media represented by the corresponding media object to create a current state of the item of digital media.

In response to user input, operation on a data item represented by one or more of the data objects can be performed. The operation can include displaying the data item on an output device, which display can be a thumbnail representation of the data item. The operation can include an edit operation, in which case a current edit object representing the edit operation performed on the data item is created, and an edit list for the corresponding data object generated. The edit list represents edit objects representing all edit operations associated with the media object. The current edit object is sequentially appended to the edit list.

In another implementation, the operation can be to associate a first data item represented by a first data object in a collection of data objects with a second data item represented by a second data object. A data item is created defining an association of the first data item represented by the first data object with the second data item representing the second data object. In the case where the first data object is a media object and the second data object is a tag object, the data item defining the association is represented by a page object. In the case where the first data object is a tag object and the second data object is a group tag object, the data item defining the association is represented by a group member object. If the association between the first data item represented by the first tag object and the second data item represented by the second data object is a parent/child relationship, then the data item defining the association can be metadata associated with the first and second data objects, the metadata specifying the parent/child relationship. Alternatively, the operation can be to disassociate a first data item represented by a first data object in the collection of data objects with a second data item represented by a second data object.

In general, in another aspect, the invention features a system for accessing data items. The system includes a client subsystem configured to receive a request to access one or more data items, the request specifying a search condition; generate a collection of one or more data objects representing data items satisfying the search condition; and generate an iterator to sequentially access the data items represented by the collection of data objects. The system further includes a server subsystem configured to use the iterator to sequentially access the data items represented by the collection of data objects.

Implementations of the invention can includes one or more of the following. The system can further include a user interface configured to receive user input specifying a request to access data items; transmit the request to the client subsystem; and receive data items from the client subsystem responsive to the request.

The data items can be stored in a data store, and the server subsystem can be further configured to communicate with the data store using commands recognizable by the data store to access data items from and write data items to the data store. In one implementation, the data store can be a database having a database management system, and the server subsystem can be further configured to communicate with the database management system using commands recognizable by the database management system to access data items from and write data items to the database. In another implementation, the data store can be a file directory system.

The invention can be implemented to realize one or more of the following advantages. Data items stored in a data store can be organized and accessed using an intuitive, user-friendly object model, independent of how the data items are actually stored. If the data store is a database, for example, traditional database concepts, such as keys, indexes and query languages, are hidden from a user and exposed only in the interface between the server subsystem and the data store, providing a user-friendly, adaptable system. Because the object model operates independent of the data store, the system can be implemented with nearly any data store, and a flexible and consistent method for accessing and organizing data items is provided. The object model permits a search for data items to be conducted, without accessing all data items responsive to the request at once, thus consuming minimal main memory storage (RAM).

The details of one or more embodiments of the invention are set forth in the accompanying drawings and the description below. Other features and advantages of the invention will be apparent from the description, the drawings, and the claims.

DESCRIPTION OF DRAWINGS

FIG. 1 is a schematic block diagram of a system for accessing and organizing data items.

FIG. 2 is a flowchart of steps for sequentially accessing data items.

FIG. 3 is a schematic block diagram of an iterator and a list.

FIG. 4 is a schematic representation of associated tag, media and page objects.

FIG. 5 is a flowchart of steps for sequentially accessing a category of digital media.

FIG. 6 is a schematic block diagram of a media iterator and a media list.

FIG. 7 is a flowchart of steps for sequentially accessing data items.

FIG. 8 is a schematic block diagram of a tag iterator and a tag list.

FIG. 9 is a schematic representation of associated tag, group member and group tag objects.

FIG. 10 is a flowchart of steps for editing digital media.

FIG. 11 is a schematic block diagram of an edit iterator and an edit list.

FIG. 12 is a flowchart showing steps for sequentially accessing a current state of an item of digital media.

FIG. 13 is a schematic block diagram of a group member iterator and a group member list.

FIG. 14 is a schematic representation of a parent/child hierarchical organization of data objects.

FIG. 15 is a schematic block diagram of a child tag iterator and a child tag list.

FIG. 16 is a schematic block diagram of a media iterator and a media list.

FIG. 17 is a schematic block diagram of a member tag iterator and a member tag list.

FIG. 18 is a schematic representation of non-nested database transactions.

FIG. 19 is a schematic representation of non-nested database transactions.

FIG. 20 is a schematic representation of nested database transactions.

Like reference symbols in the various drawings indicate like elements.

DETAILED DESCRIPTION

Data items can be sequentially accessed from a data store using an object model. The process of using an object model to access the data items can be implemented as a tiered system 100 in communication with a user interface 108 and a data store 102, as shown in FIG. 1.

The data store 102, provides persistent storage for the data items and can either be local, or in a remote location across a local or wide area network. The data items can include digital media, such as digital images or photographs, video streams, audio streams text documents, or more generally, any document having digital content. Data items can also include categories of digital media or groups of categories of digital media. Metadata about the digital media such as the date and time the digital media was captured or created, or a textual or audio annotation describing the digital media can be associated with data items. Metadata can also include the name of a category of digital media, and information identifying digital media included in the category, or historical information, such as a transaction log, about digital media. The data store can be a commercially available relational database, such as Oracle9I™ available from Oracle Corporation of Redwood Shores, Calif. Alternatively, the data store can be a file directory system.

The lower tier of the system 100, the server subsystem 104, communicates with the data store 102 to either retrieve data items from, or write data items to, the data store 102. The server subsystem 104 implements an object model, in which data items and the relationships between them are represented by data objects. The server subsystem 104 maps the object model to the data items stored in the data store 102. Communication between the server subsystem 104 and the data store 102 is by commands recognizable by the data store 102. For example, if the data store 102 is a database supporting the ODBC (Open Database Connectivity) standard, then the server subsystem 104 can communicate with the data store 102 using ODBC application programming interfaces, for example, using SQL for accessing data from the data store 102. Communication between the server subsystem 104 and the upper tier, the client subsystem 106, is in terms of the object model.

The client subsystem 106 asynchronously receives requests through a user interface 108 to retrieve data items from, or write data items to, the data store, and asynchronously sends responses to such requests to the user interface 108 or an output device, such as a printer 110. The client subsystem 106 translates a request for data items into terms of the object model and communicates the request to the server subsystem 104. The server subsystem 104 implements the object model to sequentially access data items from the data store 102 responsive to the request. The requested data items are returned to a user through the user interface 108.

FIG. 2 shows a process for accessing data items from a data store. A request to access data items stored in the data store is received (112). The request includes one or more search conditions that specify how the data store will be searched, what data items will be retrieved and/or how the retrieved data items will be presented to the user. By way of example, the search condition can include a label identifying a particular photograph, or the name of a category defined by a user to include a number of related photographs. Based on the search condition specified in the request, the system generates a collection of data objects (114) and an iterator (116). The collection includes zero or more data objects, each data object representing a data item stored in the data store that satisfies the search condition and is responsive to the request. For example, in response to a search request identifying a category of photographs, server subsystem 104 generates a collection of data objects that represent photographs included in the named category. Alternatively, the collection can include a data object that represents a category (or categories) itself, which may or may not be associated with any photographs.

The iterator is configured to sequentially access data items represented by the data objects included in the collection. The iterator is used to sequentially access the data items represented by the data objects (118). For example, photographs associated with a category specified by the search condition are sequentially accessed and retrieved from the data store, and can be presented to a user by display on an output device, such as a computer monitor. Presentation to the user can be of the complete photographs, or can be a thumbnail representation of the photographs, thus allowing a collection of thumbnail representations to be conveniently displayed on a computer screen.

In one implementation, a list can be used to represent the collection of data objects, although other data structures can be used.

FIG. 3 illustrates the relationship between an iterator 120, a list 122 and data objects 124*a-c*. The list 122 represents a collection of zero or more data objects 124*a-c*. The iterator 120 is configured to sequentially access each data object 124*a-c*, as depicted by the dashed lines, in accordance with a sequence represented by the list 122, or in accordance with a sequence defined by the data objects as described in more detail below.

A data object is an instantiation of a data object class, and represents a data item. Data object classes can include, for example, a media object class, a tag object class, an edit object class and a group tag object class. A media object is an instantiation of the media object class, and represents an item of digital media. A tag object is an instantiation of the tag object class, and represents a category of digital media. Thus, a data item is a generic term that can refer to an item of digital media, a category of digital media, or any other electronic data that can be represented by an instantiation of a data object class. Edit objects and group tag objects are described below.

A media object is "associated with" a tag object if the digital media item represented by the media object is a member of the category of digital media represented by the tag object. A media object can be associated with a zero or more tag objects, and a tag object can be associated with zero or more media objects. One advantage of the object model is that a single item of digital media can be included in more than one categories of digital media without having to duplicate the item of digital media in the data store, thus minimizing the use of storage space. This is achieved by simply associating the media object representing the item of digital media with more than one tag object.

Additional data objects can be provided to define relationships between tag objects and media objects. Thus, whenever a media object is associated with a tag object, for example when a user designates an item of digital media represented by a media object as a member of a category of digital media represented by a tag object, a page object can be created. The page object defines a relationship between the tag and media objects, and can support an arbitrary sequence of media objects as described further below.

FIG. 4 illustrates the relationship between tag objects, page objects and media objects. A media object 126 is shown as being associated with at least three tag objects 134, 136, 138. In other words, the item of digital media represented by the media object 126 is defined to belong to at least three categories of digital media represented by the tag objects 134, 136, 138. A page object exists for each tag object the media object 126 is associated with. For example, page object 132 defines a relationship between the media object 126 and tag object 138.

An item of digital media represented by a media object can be removed from a category of digital media, represented by a tag object. The page object associating the media object and the tag object can be deleted, thereby severing the relationship between the tag object and media object, and thus removing the item of digital media from the category.

The tag object 138 is shown as being associated with at least three media objects 146, 148, 150 in addition to the media object 126. That is, the items of digital media represented by media objects 126, 146, 148 and 150 are members of a category represented by the tag object 138. The tag objects 134, 136, 138 can represent user-defined categories of digital media, or can be automatically created to represent one or more items of digital media having a common characteristic, or on which a common operation was performed. For example, a user can create a category named "Lake Tahoe" to represent all of the user's photographs stored in the data store that were taken on the user's Lake Tahoe vacation.

Tag objects can also be used to record the processing history of an item of digital media. For example, if the user selects some of the photographs from the Lake Tahoe category and prints a hard copy of the subset of photographs, a tag object can be used to store a historical log of that print operation. When the user selects the items of digital media to be printed (e.g. by selecting the corresponding media objects) and specifies a print operation, the system 100 can generate a tag object to represent the operation. The operation itself can be identified by metadata associated with the tag object. The tag object is associated with the media objects representing the subset of photographs. In this manner, for example, a log of printing operations performed on a particular photograph can be generated by accessing all tag objects representing metadata about a historical print operation that are associated with a media object representing the photograph.

Media objects can be accessed by reference to a tag object. As illustrated by FIG. 5, a user can request to view all photographs included in the previously defined Lake Tahoe category (160). Any convenient means to receive such a request can be implemented with a user interface. For example, once a user has defined a category, an icon can be displayed on the user interface representing the category, in this example, the Lake Tahoe category. By activating the icon, for example with the click of a mouse, the user can request to view the photographs included in the category.

Once a request to view photographs has been received from the user interface, a list is generated (162). In this example, the user is requesting items of digital media, which are therefore represented by media objects. The search information provided by the user identifies a category of digital media, which is therefore represented by a tag object. As illustrated by FIG. 6, a list 172 can represent a tag object 174 and media objects 176, 178, which are associated with the tag object 174. The tag object 174 represents the Lake Tahoe category. The media objects 176, 178 represent photographs included in the Lake Tahoe category.

In the next step an iterator 180 is generated to sequentially access the media objects 176, 178 represented by the list 172 (164). The iterator 180 is then used to sequentially access the photographs represented by the media objects 176, 178 from the data store (166). As described above, this requires a command or commands to be generated and transmitted to the data store that are recognizable by the data store. The accessed photographs are then returned to the user interface and displayed to the user on an output device (168).

In addition to filtering the data items included in the data store, that is, returning data items satisfying a certain condition, such as belonging to a specified category, the data items responsive to a request can also be sorted according to a specified criteria. If the data items included in the data store include metadata information associated with the data items, then the data items can be sorted according to the metadata. For example, if the date an item of digital media was captured is stored as metadata associated with the item of digital media, then a request for items of digital media could include a request to sort the items of digital media responsive to the request by date. Based on the metadata, the responsive items of digital media would be returned to the user in a particular sort order. Metadata can include any kind of information specified by a user, for example, time of capture, name of photographer or source of digital media, to name a few.

It is also possible to create a list representing media objects from multiple tag objects. For the purpose of the following illustrative example, assume a user has previously organized a collection of photographs into a Lake Tahoe category, and into a Water-skiing category. The Lake Tahoe category includes all photographs taken while on a vacation at Lake Tahoe. The Water-skiing category includes all photographs taken involving water-skiing at a number of locations, including Lake Tahoe. If the user wished to find all water-skiing photographs taken while on vacation at Lake Tahoe, the user can request to view photographs by indicating both the Water-skiing and Lake Tahoe categories. In one implementation, the user can click on icons representing each of these categories to make the request.

The photographs returned to the user in response to this request can potentially include three sets of photographs: the best matching set, which are photographs of water-skiing taken at Lake Tahoe; the near matching set, which are photographs of either water-skiing or Lake Tahoe; and the non matching set, which are photographs of neither water-skiing nor Lake Tahoe. The user interface, either by user input or automatically, can specify whether one or more of these sets should be hidden so that, for example, only the best and near match sets would be made visible through the user interface.

A list is generated representing a first tag object representing the Lake Tahoe category and a second tag object representing the Water-skiing category. An iterator is generated that is configured to step through all media objects representing items of digital media in the data store, but to ignore any media objects that do not belong to one of the visible match sets, in this instance the best match and near match sets. At each iteration step, the iterator would return a media object from one of the visible match sets along with an indication as to which match set the media object belonged.

The request could also specify a sort order, and could further specify whether the photographs should be grouped and sorted by set, or grouped and sorted as one intermixed collection. For example, the first set of media objects returned during the iteration could represent all the best matching photographs sorted by date. A second set of media objects returned would represent all near matching photographs sorted by date. Media objects representing the non-matching photographs would not be returned in this instance. Alternatively, all media objects representing all the best and near matching photographs could be returned sorted by date, with the best and near matching photographs intermixed. In either case, the user interface would display the photographs represented by the media objects in whichever grouping and sort order had been requested. A visual indication can be included on or near each photograph to indicate whether it belongs to the best or near match set.

A tag object can be accessed by reference to a media object. As illustrated by FIG. 7, for example, a user can request the names of all the categories in which a specific photograph is included, in this instance the sailboat photograph (190). The user may have included the sailboat photograph in the Lake Tahoe category, but may have also created a separate category for all sailboat photographs. The sailboat photograph is represented by a media object, and the categories of photographs including the sailboat photograph are represented by tag objects.

As illustrated by FIG. 8, a list 210 is then generated representing a media object 212, which represents the sailboat photograph, and a collection of tag objects 214, 216 associated with the media object 212 by page objects 215, 217 (192). The tag objects 214, 216 represent the categories responsive to the user's request. An iterator 218 is generated to sequentially access the tag objects 214, 216 represented by the list 210. The list 210 and the iterator 218 are then used to sequentially access the data items represented by the tag objects 214, 216 (196). In this example, the user has requested the names of the categories including the sailboat photograph. The name of a category represented by a tag object can be included as metadata in the data item represented by the tag object. Accordingly, once the data items represented by the tag objects 214, 216 are accessed from the data store, the names of the categories can be determined from the metadata and returned to the user by way of the user interface (198).

A group including two or more categories of digital media can be defined, either by a user or automatically. A data item identifying the group by name and the categories included within the group can be represented by a group tag object, an instantiation of the group tag object class. A group tag object represents zero or more tag objects included in the group, each tag object representing zero or more media objects as described above. Each time a tag object is associated with a group tag object, a group member object is created. A group member object represents the relationship between a group tag object and a tag object, and is similar in concept to a page object in relation to a media object and a tag object.

FIG. 9 shows the relationship between a group tag, group member and tag objects. A group represented by a group tag object 230 includes three categories of digital media, represented by three tag objects 232, 234, 236. Group member objects 238, 240, 242 associate each tag object 232-236 and the group tag object 230. A category of digital media can be included in more than one group of categories. For example, as shown, the category represented by tag object 236 is not only a member of a group represented by the group tag object 230, but is also a member of the groups represented by group tag objects 244, 246 and 248. Group member objects 250, 252, 254 associate the tag object 236 with each of the group tag objects 244, 246, 248. All of the media objects associated with a group tag object, by associations with the tag objects included in the group, can be accessed by reference to the group tag object, described in further detail below.

Items of digital media are maintained in the data store in their original, unaltered state, even if an edit operation has been performed on the items of digital media. As illustrated by FIG. 10, a user can request to edit an item of digital media, for example, a photograph (260). The edit operation can be any type of operation, such as cropping, rotating or re-sizing the photograph. The user performs the edit operation on the photograph, for example, by clicking a rotation button in the user interface to rotate the image (262). The digital media item stored in the data store corresponding to the photograph is not altered. Accordingly, in order for the user to subsequently retrieve the rotated photograph from the data store, the edit operation performed on the photograph must somehow be stored in the data store. An edit object is a data object representing an edit operation performed on an associated media object, and is an instantiation of the edit object class The edit object also represents information identifying the associated media object, and sequencing information indicating the edit object's place in a sequence of edit operations performed on the digital media item represented by the associated media object. In the next step, an edit list is generated representing all edit objects associated with the media object representing the photograph (264). If no edit operations had previously been performed on the photograph, then the edit list will be empty.

FIG. 11 shows an edit list 272 representing a media object 274 having three associated edit objects 276, 278, 280. The media object 274 represents the photograph. Each edit object 276-280 represents an edit operation previously performed on the photograph. A new edit object is created to represent the edit operation of rotating the photograph performed by the user (266). The new edit object is then sequentially appended to the edit list 272 (268). In this instance, the new edit object would be appended to the edit list 272 following the last edit object 280. A data item representing the edit operation, which is represented by the new edit object, can then be stored in the data store for later access.

Items of digital media included in categories of digital media that are within a group of categories can be accessed by reference to the group of categories. FIG. 12, by way of illustrative example, shows that a user can request to view all of the users "Vacation" photographs. For the purpose of this example, it is understood the user previously categorized his photographs by vacation, including his Lake Tahoe vacation, Hawaii vacation and Mexico vacation. The user also created a group named "Vacation" that included each of the three categories, namely, Lake Tahoe, Hawaii and Mexico. The user may have also performed one or more edit operations on some or all of the photographs included in these categories.

The user now requests to view the current state of all Vacation photographs (300). A list is generated representing media objects that represent photographs responsive to the request (302). FIG. 13 shows a list 330 representing a group tag object 332, which group tag object represents the Vacation group of photographs. The group tag object 332 is associated with three tag objects 334, 336, 338, each representing a category of digital media included in the group. For example, tag object 334 can represent the Lake Tahoe category of photographs, tag object 336 can represent the Hawaii category of photographs, and tag object 338 can represent the Mexico category of photographs. Each tag object 334-338 is associated with media objects representing photographs included in the category represented by the tag object. Tag object 334 is associated with media objects 346a-c by way of page objects 348a-c. Media objects 346a-c represent the Lake Tahoe photographs included in the Lake Tahoe category. Similarly, media objects 350a-g represent the Hawaii photographs included in the Hawaii category, and media objects 354a-k represent the Mexico photographs included in the Mexico category.

In the next step, an iterator 358 is generated to sequentially access the media objects 346a-c, 350a-g, 354a-k from the data store (304). Using the list 330 and the iterator 358, a media object, for example, media object 346a, is accessed from the data store (306). Because the photograph represented by the media object 346a may have been altered by one or more edit operations, it must be determined whether or not any edit objects are associated with the media object 346a (308).

If one or more edit objects exist that are associated with the media object 346a ('Yes' branch of decision step 308), then an edit list is generated representing edit objects associated with the media object 346a (310). An edit iterator is generated to sequentially access the edit objects represented by the edit list (312). As discussed above, an item of digital media that has been altered by edit operations is retained in an unaltered state, as represented by a media object. A current state of the digital media item is achieved by sequentially reapplying each edit operation previously performed on the digital media item, using an edit list and edit iterator. Using the edit iterator, the edit objects associated with the media object 346a are sequentially accessed, and the edit operations represented by the edit objects are sequentially reapplied to the photograph represented by the media object 346a, to create a current state of the photograph (314). The current state of the photograph is then returned to the user by way of the user interface (316).

A determination is then made as to whether or not there remain media objects represented by the list 330 to be accessed (318). In this instance, it would be determined that media objects remained to be accessed ('Yes' branch of decision step 318), and the iterator 358 would be used to access the next media object in sequence, for example, media object 346b. It would then be determined whether or not edit objects existed that were associated with media object 346b, and the process would continue as described above until every media object had been accessed and the current state of the corresponding photographs returned to the user interface.

A user can select certain items of digital media on which to perform an operation. For example, if a collection of digital media is displayed on a computer monitor by thumbnail representations of the digital media, a user can select certain of the digital media by clicking on—or otherwise highlighting—the corresponding thumbnail representations. Each time a user selects or deselects an item, the user interface informs the client subsystem, such that the client subsystem knows which media objects representing the selected items have been added to or removed from the selection. The user can then perform an operation to be applied to all digital media items represented by the selected thumbnail representations. For example, the user can choose to print a hard copy of all selected items of digital media. The client subsystem will therefore only return the selected items of digital media to an output device for printing, because the client subsystem has kept track of which media objects representing the selected items of digital media are included in the current selection.

In another example, the user can perform an edit operation on all digital media items represented by the selected thumbnail representations. A common problem with many digital images is that when a digital camera is rotated to a take a portrait photo, the resulting digital image needs to be rotated by 90°, so that it is not displayed sideways. A user might select multiple digital images to be rotated by clicking on thumbnail representations of the corresponding images. As discussed above, the client subsystem creates an edit list for each media object representing a selected digital image, the edit list representing the edit objects associated with a media object. A corresponding edit iterator is generated, traverses the edit list and appends a new edit object representing the rotation operation onto the edit list. A data item represented by the edit object is then written to the data store, so that when the data store is later searched for the corresponding digital image, an updated edit list can always be returned to display a current state of the digital image.

The object model permits a search for data items to be conducted, without accessing all data items responsive to the request at once, thus consuming minimal main memory storage (RAM). For example, a user can request to perform an edit operation on all photographs included in a category of photographs. A list can be generated representing a tag object representing the category of photographs. Using a corresponding iterator, one at a time a photograph can be accessed, and the edit operation performed, thus requiring only one photograph, rather than the entire collection of photographs, to consume memory storage at any given time.

Categories of digital media can be associated with one another using parent/child relationships, creating a hierarchical relationship among categories. FIG. 14 illustrates a parent/child hierarchical organization of multiple tag objects representing categories of digital media. At the top of the hierarchy is a tag object 370 representing a category of digital media identified by the name "Sports". The sports tag object 370 is a parent to three children tag objects, namely the water sports tag object 372, the summer sports tag object 374 and the team sports tag object 376. The water sports tag object 372 represents a category of digital media identified by a user as "water sports" and is a sub-category of the sports category represented by the sports tag object 370. The water sports tag object 372 is not only a child with respect to the sports tag object 370, but is also a parent with respect to two child tags, the water-skiing tag object 378 and the boating tag object 380. In this manner, a tag object can be both a parent and a child tag. Similarly, the boating tag object 380, a child with respect to the water sports tag object 372, is a parent with respect to the sailing tag object 390 and the kayaking tag object 392.

By arranging categories of digital media in such a hierarchical organization, a user can easily access digital media items at any level. For the purpose of an illustrative example, assume that the media objects associated with tag objects in the hierarchy represent photographs. A user can request to view all boating related photographs. In this example, the request includes a reference to a parent tag object, namely the boating tag object 380. The parent/child relationship between the water sports tag object 372 and the boating tag object 380 is not relevant for the purpose of responding to this particular request.

As shown in FIG. 15, a list 398 is generated representing the parent-boating tag object 380, which represents the two child tag objects, the sailing tag object 390 and the kayaking tag object 392. The sailing tag object 390 is associated with media objects 394*a-k*, each media object representing a photograph included in the sailing category. The kayaking tag object 392 is associated with media objects 396*a-j*, each media object representing a photograph included in the kayaking category. An iterator 399 is generated to sequentially access each child tag object and associated media object represented by the parent-boating tag object 380. Using the iterator 399, the photographs represented by the sailing and kayaking media objects are sequentially accessed from the data store.

The user could have broadened his request to include all sports related photographs, in which case a list would be generated representing all media objects associated with all child tag objects falling under the sports parent tag object in the hierarchy.

To avoid infinite recursion issues in the tag-to-tag relationships, although any tag object may play the role of a group tag object or a parent tag object, one tag object can never play the role of both group tag and parent tag object. However, one tag object can play the role of a child tag object, group tag object or be associated with a group tag object as a group member.

A page object can be used to define an arbitrary sequence of media objects associated with a tag object. As discussed above, a page object defines a relationship between a media object and a tag object. A page object can also represent an ordering of the media objects associated with the tag object so that, for example, the items of digital media represented by the media objects will be presented to a user in a user-defined sequence when a user requests to view the digital media items within a specified category.

FIG. 16 shows a list 400 representing a tag object 402. The tag object 402 is associated with three media objects 410, 412, 414 by way of three page objects 404, 406, 408. The numbers 1, 3 and 2 indicated above the page objects 404-408 reference the arbitrarily defined sequence of the media objects 410-414 in association with the tag object 402. Using the iterator 420 to access the media objects 410-414 represented by the tag object 402 will always result in the media objects being accessed according to the predefined sequence, that is, media object 410 first, media object 414 second, and media object 412 third. The sequence is maintained by information represented by the page objects 404-408. Page object 404 is associated with the first media object 410 in the sequence. The line 416 shown between page object 404 and page object 408 indicates that page object 404 represents information identifying page object 408, and therefore corresponding media object 414, as next in the sequence. Similarly, the line 418 shown between page object 408 and page object 406 indicates that page object 408 represents information identifying page object 406, and therefore corresponding media object 412, as next in the sequence. When iterating the list 400, the iterator 420 steps through the media objects 410-414 in the sequence defined by the page objects 404-408, as just described. The defined sequence can be user defined, similar in concept to a user indicating the page numbers for pages of photographs be included in a photo album or slide show, or can be automatically defined based on a criteria.

As another example of the use of page objects to define a sequence, a tag object can be associated with a number of media objects, using page objects to define a sequence, for the purpose of, for example, a slide show. A user may wish to include a particular item of digital media in the slide show in more than one location. Without duplicating the item of digital media in the data store, the media object representing the item of digital media can be associated with the tag object more than once, using more than one page objects. Each page object would define a different location of the item of digital media in the slide show.

As shown in FIG. 17, tag objects 434, 436, 438 that are associated with a group tag object 432 can also be accessed according to an arbitrary sequence, by using sequencing information represented by the corresponding group member objects 440, 442, 444. A group member object, like a page object, can represent sequencing information for a corresponding tag object. In the example shown, the iterator 450 will access the tag objects 434-438 according to the sequence defined by the group member objects 440-444, as indicated by the lines 446, 448 joining the group member objects 440-444. That is, first tag object 434, second tag object 438 and third tag object 436.

The process for accessing data items from a data store described above can be implemented to support arbitrary levels of nested transactions to provide improved data integrity, whether or not supported by the underlying data store. Larger more complex transactions can be composed of smaller transactions, each of which is protected by the transaction mechanism, whether used individually or as part of the larger transaction. Data integrity is therefore improved, because either the entire transaction, no matter how simple or complex, succeeds or fails. Performance is also enhanced for larger, multi-step transactions, because the entire transaction is committed to what is often relatively slow external data storage in a single operation.

FIG. 18 shows a representation of a typical, non-nested transaction with a database 460. Transaction A 462 is written to the database 460 independent of transaction B 464. FIG. 19 shows a scenario in which a transaction A 466 is successfully completed with the database 460, but a transaction B 468 fails and is aborted. If transaction A and transaction B together formed a multi-stepped transaction, then the failure of a step within the multi-stepped transaction would adversely affect the data integrity of the database 460. FIG. 20 shows a nested, multi-stepped transaction C 470 is shown. Included within transaction C are two steps, namely transaction A and transaction B. In order for transaction C to be successfully completed with the database 470, each step must also be successful. That is, transaction C will either succeed if both transactions A and B succeed, or will fail if either or both of transactions A or B fail.

For maximum performance in networked and multiprocessor systems, and to provide the greatest level of responsiveness for other areas of the application, the client subsystem and the server subsystem together provide the ability to run on separate execution threads. If desired, and if supported by the underlying DBMS in the data store, several such threads can operate simultaneously, each with its own communication channel to the data store. A key benefit of this method is that tasks that, for instance, need access to both the local database and relatively slow network services can take place on a background thread with minimal performance impact on other tasks that simultaneously access the same local data store.

The invention can implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims.

What is claimed is:

1. A computer-implemented method, comprising:
   receiving a request for a plurality of data items, the request specifying a search condition;
   searching a data store comprising a plurality of data objects representing data items for data items satisfying the search condition, the plurality of data objects comprising one or more media objects, one or more tag objects and one or more page objects, where:
     a media object represents an item of digital media and is an instantiation of a media object class;
     a tag object represents a category of digital media and is an instantiation of a tag object class and each media object can be associated with zero or more tag objects; and
     a page object defines a relationship between a tag object and a media object;
   generating a collection of data objects representing data items that satisfy the search condition;
   using an iterator to sequentially access the data items represented by the data objects in the collection; and
   providing the data items to a user interface.

2. The method of claim 1, wherein:
   the search condition specifies a category of digital media represented by a first tag object; and
   generating the collection of data objects comprises identifying media objects associated with the first tag object.

3. The method of claim 1, wherein:
   the search condition specifies metadata; and
   generating the collection of data objects comprises identifying data items based at least in part on the metadata, where the data objects represent the identified data items.

4. The method of claim 1, wherein:
   the search condition specifies one or more digital media items including one or more of a digital image, video stream, audio stream or text document; and
   generating the collection of data objects comprises identifying one or more categories of digital media associated with the specified digital media items, where the collection of data objects comprises tag objects representing the identified digital media categories.

5. The method of claim 1, wherein:
   the search condition specifies a first digital media item; and
   generating the collection of data objects comprises identifying one or more operations previously performed on the first digital media item, where the collection of data objects comprises data objects representing the identified operations for the first digital media item.

6. The method of claim 5, wherein the identified operations include edit operations, the method further comprising:
   using the iterator to sequentially access the identified edit operations and to reapply each edit operation to create a current state of the first digital media item.

7. A machine-readable storage device encoded with a computer program product comprising instructions operable to cause data processing apparatus to perform operations comprising:
   receiving a request for a plurality of data items, the request specifying a search condition;
   searching a data store comprising a plurality of data objects representing data items for data items satisfying the search condition, the plurality of data objects comprising one or more media objects, one or more tag objects and one or more page objects, where:
     a media object represents an item of digital media and is an instantiation of a media object class;
     a tag object represents a category of digital media and is an instantiation of a tag object class and each media object can be associated with zero or more tag objects; and
     a page object defines a relationship between a tag object and a media object;
   generating a collection of data objects representing data items that satisfy the search condition;
   using an iterator to sequentially access the data items represented by the data objects in the collection; and
   providing the data items to a user interface.

8. The machine-readable storage device encoded with the computer program product of claim 7, wherein:
   the search condition specifies a category of digital media represented by a first tag object; and
   generating the collection of data objects comprises identifying media objects associated with the first tag object.

9. The machine-readable storage device encoded with the computer program product of claim 7, wherein:
the search condition specifies metadata; and
generating the collection of data objects comprises identifying data items based at least in part on the metadata, where the data objects represent the identified data items.

10. The machine-readable storage device encoded with the computer program product of claim 7, wherein:
the search condition specifies one or more digital media items including one or more of a digital image, video stream, audio stream or text document; and
generating the collection of data objects comprises identifying one or more categories of digital media associated with the specified digital media items, where the collection of data objects comprises tag objects representing the identified digital media categories.

11. The machine-readable storage device encoded with the computer program product of claim 7, wherein:
the search condition specifies a first digital media item; and
generating the collection of data objects comprises identifying one or more operations previously performed on the first digital media item, where the collection of data objects comprises data objects representing the identified operations for the first digital media item.

12. The machine-readable storage device encoded with the computer program product of claim 11, wherein the identified operations include edit operations, the method further comprising:
using the iterator to sequentially access the identified edit operations and to reapply each edit operation to create a current state of the first digital media item.

13. A system comprising:
a processor;
a storage device coupled to the processor and configurable for storing instructions, which, when executed by the processor cause the processor to perform operations comprising:
receiving a request for a plurality of data items, the request specifying a search condition;
searching a data store comprising a plurality of data objects representing data items for data items satisfying the search condition, where the data objects comprising one or more media objects; one or more tag objects and one or more page objects, where:
a media object represents an item of digital media and is an instantiation of a media object class;
a tag object represents a category of digital media and is an instantiation of a tag object class and each media object can be associated with zero or more tag objects; and
a page object defines a relationship between a tag object and a media object;
generating a collection of data objects representing data items that satisfy the search condition;
using an iterator to sequentially access the data items represented by the data objects in the collection; and
providing the data items to a user interface.

14. The system of claim 13, wherein:
the search condition specifies a category of digital media represented by a first tag object; and
generating the collection of data objects comprises identifying media objects associated with the first tag object.

15. The system of claim 13, wherein:
the search condition specifies metadata; and
generating the collection of data objects comprises identifying data items based at least in part on the metadata, where the data objects represent the identified data items.

16. The system of claim 13, wherein:
the search condition specifies one or more digital media items including one or more of a digital image, video stream, audio stream or text document; and
generating the collection of data objects comprises identifying one or more categories of digital media associated with the specified digital media items, where the collection of data objects comprises tag objects representing the identified digital media categories.

17. The system of claim 13, wherein:
the search condition specifies a first digital media item; and
generating the collection of data objects comprises identifying one or more operations previously performed on the first digital media item, where the collection of data objects comprises data objects representing the identified operations for the first digital media item.

18. The system of claim 17, wherein the identified operations include edit operations, the method further comprising:
using the iterator to sequentially access the identified edit operations and to reapply each edit operation to create a current state of the first digital media item.

19. A computer-implemented method, comprising:
providing a data store comprising a plurality of data objects representing data items, wherein the data objects include:
media objects being instantiations of a media object class, where the data item represented by a media object is a digital media item; and
tag objects being instantiations of a tag object class, where the data item represented by a tag object is a category of digital media;
receiving a user input performing an operation to associate a first data item represented by a first data object with a second data item represented by a second data object in the data store;
generating a third data object that represents a third data item, wherein the third data object defines the association of the first data object representing the first data item and the second data object representing the second data item; and
searching the data store for data items satisfying a search condition;
generating a collection of data objects representing data items that satisfy the search condition;
using an iterator to sequentially access the data items represented by the data objects in the collection.

20. The method of claim 19, wherein the first data object is a media object, the second data object is a tag object and the third data object is a page object.

21. The method of claim 19, wherein the first data object is a tag object, the second data object is a group tag object and the third data object is a group member object, where a group tag object represents groups of categories of digital media and is an instantiation of a group tag class.

22. A computer-implemented method, comprising:
providing a data store comprising a plurality of data objects representing data items, wherein the data objects include:
media objects being instantiations of a media object class, where the data item represented by a media object is a digital media item;

tag objects being instantiations of a tag object class, where the data item represented by a tag object is a category of digital media;
page objects defining a relationship between a tag object and a media object; and
edit objects being instantiations of an edit object class, where the data item represented by an edit object is an edit operation;
receiving a user input performing an edit operation on a first digital media item represented by a first media object;
generating a current edit object representing the edit operation performed on the first digital media item;
generating an edit list for the first media object, the edit list representing edit objects representing all edit operations associated with the first media object including the current edit object, where the current edit object is sequentially appended to the edit list; and
using an edit iterator to sequentially access the edit operations for the first media object and to reapply each edit operation to the first digital item represented by the first media object to create a current state of the first digital media item.

* * * * *

UNITED STATES PATENT AND TRADEMARK OFFICE
CERTIFICATE OF CORRECTION

| | | |
|---|---|---|
| PATENT NO. | : 7,921,111 B1 | Page 1 of 1 |
| APPLICATION NO. | : 11/935991 | |
| DATED | : April 5, 2011 | |
| INVENTOR(S) | : Greg Beddow | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 331 days.

Signed and Sealed this
Twenty-sixth Day of July, 2011

David J. Kappos
*Director of the United States Patent and Trademark Office*